Figure 1:
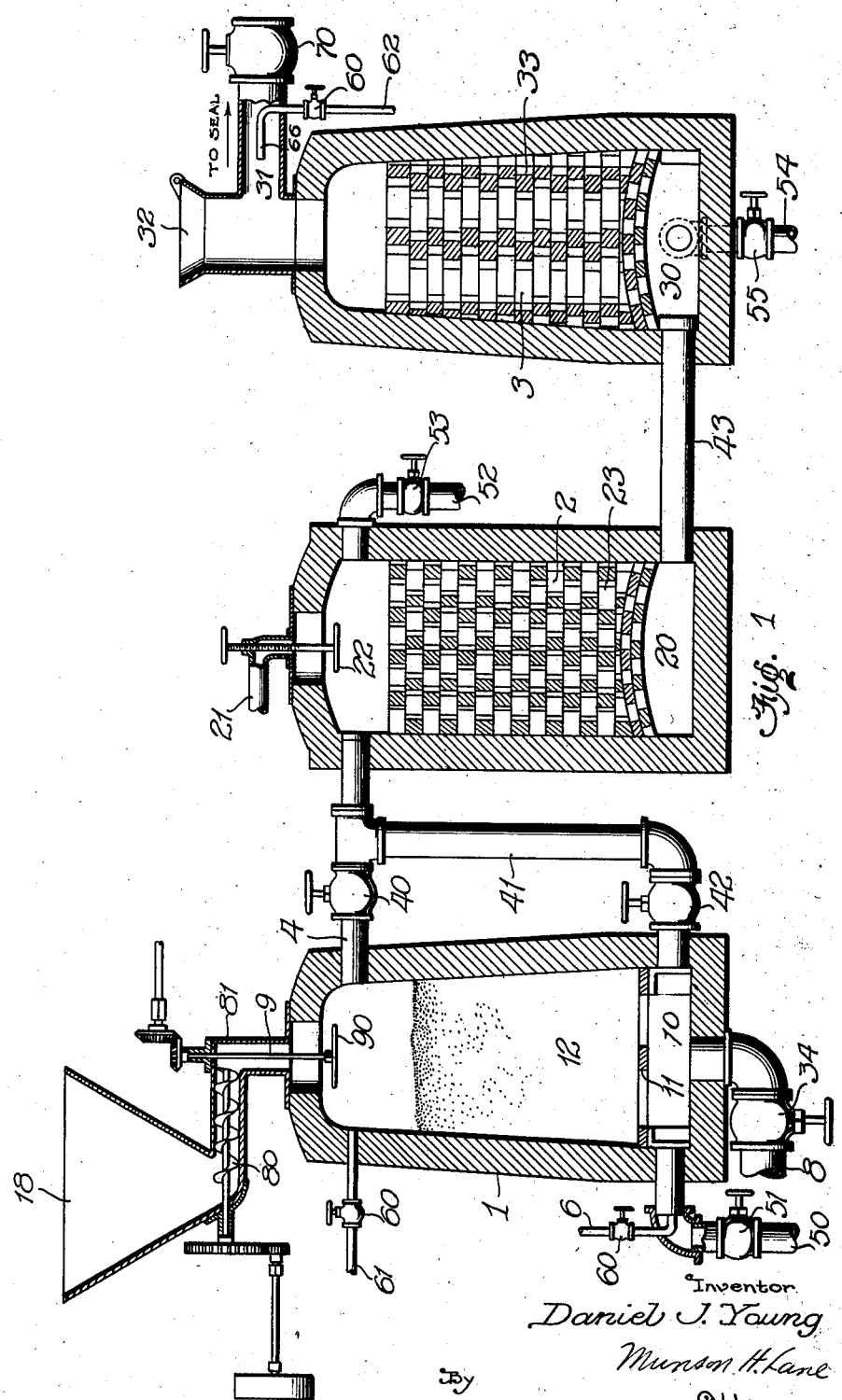

March 25, 1930.  D. J. YOUNG  1,751,784
APPARATUS FOR THE MANUFACTURE OF ILLUMINATING GAS
Filed Aug. 20, 1923

Inventor
Daniel J. Young
Munson H. Lane
By  Attorney

Patented Mar. 25, 1930

1,751,784

UNITED STATES PATENT OFFICE

DANIEL J. YOUNG, OF TACOMA, WASHINGTON, ASSIGNOR TO YOUNG-WHITWELL GAS PROCESS CO., OF TACOMA, WASHINGTON, A CORPORATION OF WASHINGTON

APPARATUS FOR THE MANUFACTURE OF ILLUMINATING GAS

Original application filed June 14, 1921, Serial No. 477,365. Divided and this application filed August 20, 1923. Serial No. 658,393.

The present invention relates to an apparatus for the manufacture of illuminating gas and is a division of my application for process of making illuminating gas, Serial No. 477,365, filed June 14, 1921, Patent No. 1,468,190.

One of the objects of the invention is to equip the ordinary carbureted water gas plant, comprising a generator, a single carburetor and a single superheater connected in series in constant and uniform relation with means for reversing the flow of steam through the entire plant.

A further object is to provide a carbureted water gas plant consisting of a generator, a single carburetor and a single superheater, connected in series in constant and uniform relation and having a permanently free passage between the generator and the carburetor, and to provide means for reversing the flow of steam through such a plant as a whole.

Another object of my invention is to make it possible to easily add to the usual water gas apparatus, such parts as may be necessary to enable the same to be operated in accordance with my invention and therefore to enable these plants to be operated at a higher efficiency and with greater flexibility than is possible with the present method of operation.

Another object is to economically utilize the excess heat which is generated in such plants when coal instead of coke is used as the charging fuel for the generator.

A further object of my invention is to prevent objectionable clogging with deposited carbon of the heat transferring parts of the apparatus, such as the carburetor and the superheater, and also to periodically convert such carbon as may be deposited in such parts of the apparatus into gaseous oxides of carbon, thus eliminating the objectionable result of clogging the apparatus and at the same time converting the carbon which is deposited therein into gas.

Other objects of my invention will be disclosed by the description which is to be given thereof, and the features which I believe to be new and upon which I desire to secure Letters Patent will be particularly set forth in the claims.

Fig. 1 of the accompanying drawings is a central vertical section of a standard type of construction for water gas plants to which has been added the features which are novel to the present invention.

This plant as illustrated consists of a water gas generator 1, a carburetor 2, and a superheater 3, these being of any standard or satisfactory type of construction. These parts are provided with the usual connections for the transfer of gas and air from one to the other. These connections comprise a pipe 4 connecting the upper parts of the generator and carburetor and containing therein a valve 40; a pipe 41 provided with a valve 42, connecting the pipe 4 with the chamber 10 of the generator beneath the grate 11 and a pipe as 43 connecting with each other the chambers 20 and 30 contained at the bottom of the carburetor and superheater, respectively.

The upper part of the superheater is provided with the usual gas off-take connection, as 31 leading to the usual seal pot (not shown), and also with a stack valve, as 32, which is opened for the discharge of the gases formed during the air blasting run. The above features are substantially standard in the construction of a water gas plant. The carburetor is also provided with means for introducing oil or other suitable enriching hydrocarbons at its upper end, this being represented by a pipe, as 21, and a nozzle as 22, which is placed just within the chamber of the carburetor. This is, or may be, also of standard construction.

A steam pipe 6 is provided for supplying steam to the bottom of the generator and a like pipe 61 for supplying steam above the fuel bed of the generator. Valves 60 control these steam pipes. If desired, the steam to pipes 6, 61 and 62 may be supplied from a single source, and a single multi-way valve employed, or the valves 60 may be controlled from a single source of power, such valve interconnection being well-known in the art. These steam connections are, or may be, also of standard construction. Steam pipe 61 may be used in making down runs, as is common in water gas generators. At such times the gas passes to the carburetor through pipe 41. A similar steam supply pipe 62 is placed at the discharge end of the superheater 3, this being peculiar to my invention. A gas off-take pipe 8 provided with valve 34 connects with the bottom of the generator and leads to the usual seal pot (not shown), this being also peculiar to my invention.

Air for use in blasting is supplied beneath the fuel bed of the generator through pipe 50 and is controlled by valve 51. Supplemental air supply pipe 52 connects with the upper part of the carburetor and is controlled by valve 53. A supplemental air pipe 54, connects with the bottom of the superheater and is controlled by valve 55.

In operating in accordance with the usual practice of a water gas plant, air would be introduced for a period beneath the grate 11 and would pass up through the fuel bed 12 during the blasting process. Supplemental air would also be introduced when desired through pipe 52 to the carburetor and pipe 54 to the superheater, as may be necessary for proper combustion. This supplemental air is controlled by valves 53 and 55. The products of combustion consisting of blast gases or producer gas when leaving the generator would be passed over through the pipe 4 to the carburetor, through the checkerwork 23 therein, taken through the pipe 43 to the superheater 3 and up through the checkerwork 33 therein being burned in the carburetor and superheater by air admitted at 53 and 54 and passed out through the stack valve 32, whereby heat would be stored in the checkerwork.

In the gas making run the air supply from pipes 50, 52, and 54, would be discontinued and steam introduced through the pipe 6 or pipe 61 according as the run was up or down. During this run oil would be introduced through the pipe 21 and the operation would be exactly in conformity with the usual gas making run of a water gas plant.

In carrying out my process the air blasting run is carried to a point where the fuel bed in the generator and the checkerwork in both the carburetor and the superheater are raised to a temperature equal to, or somewhat higher, than that which would be required by the operation of the usual water gas process.

Instead of following this blasting operation by the usual gas making run, in which steam is first passed through the fuel bed to the generator, I may introduce steam at the top of the superheater as from a pipe 62 into the pipe 31, which is at the gas off-take end of the usual water gas plant. This steam is passed in a reverse direction to that usually employed, passing first through the superheater 3, thence through the carburetor 2 and then finally through the incandescent fuel in the generator where it is broken up, the resultant gas being taken out at the point as pipe 8, where air and bottom steam would normally be introduced to the generator, in carrying out the usual water gas process. This steam absorbs heat from the superheater and the carburetor until it is highly superheated. When it reaches the generator it comes in contact with the coal or other fuel which has been or is being introduced therein. This steam is sufficiently hot to volatilize some of the constituents of the coal and particularly so, if the coal be very finely reduced or powdered. The result when a high volatile fuel is used is the formation by distillation of a considerable amount of gas which is passed through incandescent fuel and discharged through the pipe 8.

Any suitable and well known means for reversing the flow of gas through the entire plant may be employed. Ordinarily this result will be accomplished by the use of valves 34 and 70 which may be placed in the pipes 8 and 31 respectively, or, if desired, seal pots of any suitable construction may be used. Obviously, by thus reversing the flow of gas through the plant as a whole the necessity for reversing the flow within the generator itself is avoided, and consequently the down-run steam line 61 and the hot valve 40 of the usual gas set, are rendered functionless or may be dispensed with entirely. Similarly, the valve 42 and pipe 41 of the old form of gas plant are rendered ineffective and may be eliminated.

The steam in passing through the superheater and the carburetor comes in contact with any carbon which may have been deposited therein during the operation of the plant in the usual manner of a water gas plant. This carbon being highly heated and incandescent, combines with the steam to form gaseous oxides of carbon, thus securing two desirable results, one, the utilization of this carbon for the making of gas, and the other, the prevention of clogging of the superheater and the carburetor with carbon with the resulting necessity of so frequently cleaning the same.

When the superheater and the carburetor have, by such a run as just described been reduced in temperature to that which is most desirable for the operation of a water gas plant, this flow of steam is cut off and the usual flow of steam as customary in usual water gas operation is commenced through the fuel bed in the generator, the gas thereby formed passing on through the carburetor and superheater. During this run the supply of coal to the generator, if coal is the fuel, may be discontinued and the supply of oil to the carburetor commenced. When the fuel bed has been reduced to the minimum desirable temperature for gas making, this water gas making run is stopped and the air blasting run is started, after the usual manner of operating a water gas plant. Those versed in the art will recognize that the foregoing procedure is merely an example and that other operating methods are feasible with my apparatus.

The process above described is generally known as the full back run, and may be employed where it is desirable to most efficiently utilize the heat stored in the checkerbrick of the carburetor and superheater and to remove accumulated carbon from the checkerbrick thereon. Obviously, however, steam may be admitted to the set at other points, as for example, at the top of the generator through the pipe 61, which steam may be passed downwardly through the generator, reacting with the incandescent fuel in the generator to produce combustible gas, which gas may be withdrawn directly from the bottom of the generator through the pipe 8 for storage or use. Likewise, while steam is preferred, other fluids capable of reacting with the incandescent fuel in the generator to produce gas, may be introduced into the set, and may be employed similarly to the steam as carriers of heat for utilizing the heat stored in the system during the air blasting operation. As examples of such fluids are hydrogen, carbon monoxide, atmospheric air, water or other liquids or even powdered fuel containing volatiles, all of which may be embraced within the generic term "fluids".

Thus, while the apparatus is primarily intended for the manufacture of carbureted water gas, it may be employed for analogous purposes, as for example, in distillation processes, for the treatment of oil shale, the manufacture of motor fuels and the like. The distillation process may be combined with the water gas process by introducing powdered coal or other carbonaceous fuel containing volatiles into the heated apparatus simultaneously with the passage of steam or other gas through the apparatus, such fuel being introduced into the apparatus in any desired manner, or at any desired location.

The means for introducing coal or other fuel to the generator may be varied as desired and any apparauts used which is found suitable. Likewise, fuel may be introduced continuously or intermittently as desired. The apparatus illustrated consists of a hopper 18 for containing powdered coal, a screw feed 80 by which this is delivered in regular amounts to the charging pipe 81 by which it is admitted to the generator. It also includes a revolving shaft 9 to which is secured a disc 90 upon which the coal falls and from which it is discharged so as to be distributed instead of being all deposited at one point.

With the above apparatus operating in the manner described, the excess heat which has been found to be generated when coal is used for charging the generator, is utilized in the superheating of the steam and this in turn for the volatilization of the raw coal which is being charged in the generator, thus forming a certain amount of coal gas which is added to the water gas. This heat is therefore usually used instead of being wasted, as has been the case in such apparatus when charged with coal and operated after the manner of usual water gas operation.

The passage of steam through the carburetor and the superheater of the usual water gas apparatus without first passing it through the generator is an effective manner of preventing clogging of these parts with carbon, as deposited carbon would thus be converted into gas. This is a desirable result and an improvement upon the former plan of operation which may be practiced whether or not the other steps of my process are employed.

Where the apparatus is employed in connection with a process other than that of making carbureted water gas the shells 2 and 3 referred to as the carburetor and superheater may be designated as "primary" and "secondary" heat interchangers respectively. The apparatus is, however, intended primarily for the manufacture of carbureted water gas.

What I claim as my invention is:—

1. A carbureted water gas plant comprising a single generator, a single carburetor, and a single superheater, connected in series in constant and uniform relation, there being a permanently free passage between the generator and the carburetor, with means for producing a reversal of steam flow through the entire plant.

2. A carbureted water gas plant comprising a single generator, a single carburetor, and a single superheater, connected in series in constant and uniform relation, there being a permanently free passage between the generator and the carburetor, means for producing a reversal of steam flow through the entire plant, and means for introducing fuel to the generator during the reverse flow of the steam.

3. A carbureted water gas plant comprising a single generator, a single carburetor, and a single superheater, connected in series in constant and uniform relation, there being a permanently free passage between the generator and carburetor, with means both for supplying steam and drawing off gas at each end of the series.

4. A carbureted water gas plant comprising a single generator, a single carburetor, and a single superheater, connected in series in constant and uniform relation, and means both for supplying steam and drawing off gas at each end of the series.

5. A carbureted water gas plant, comprising a single generator, a single carburetor, and a single superheater, a steam supply means and a gas off-take at each end of the apparatus whereby a reverse circulation of steam through the entire plant may be effected, and means for supplying raw fuel to the generator during the said reverse flow of steam.

6. A carbureted water gas plant comprising a single generator, a single carburetor, and a single superheater, connected in series in constant and uniform relation, a steam supply means and a gas off-take at each end of the apparatus whereby a reverse circulation of steam through the entire plant may be effected, and means for supplying raw fuel to the generator during the said reverse flow of steam.

7. In a carbureted water gas making plant, a single generator, a single carburetor, and a single superheater, connected in series, separate means for supplying air and steam to the generator, means for supplying steam to the discharge end of the superheater whereby a reverse flow through the entire plant may be effected, means for supplying raw fuel to the generator simultaneously with the said reverse flow of steam, and means for drawing off gas from the generator.

8. A carbureted water gas set comprising a single generator, a single carburetor, and a single superheater, connected in series in constant and uniform relation and having a permanently unobstructed main passage between the shells of the set, and a jet device for reversing the direction of flow through such series as a whole.

9. A carbureted water gas set comprising a single generator, a single carburetor, and a single superheater, connected in series in constant and uniform relation, and having a permanently unobstructed main passage between the successive shells of the set, and means for reversing the direction of gas flow through such series as a whole.

10. A carbureted water gas set comprising a single generator, a single carburetor, and a single superheater, connected in series in constant and uniform relation, and means located beyond the superheater off-take for reversing the direction of gas flow through such series as a whole, whereby the gas is superheated prior to its entrance into the fuel bed of the generator.

11. A carbureted water gas set comprising a single generator, a single carburetor, and a single superheater, connected in series in constant and uniform relation, and a steam jet located beyond the superheater off-take for reversing the gas flow through the series as a whole, whereby the steam is superheated prior to its entrance into the fuel bed of the generator.

12. A carbureted water gas set comprising a single generator, a single carburetor, and a single superheater, connected in series in constant and uniform relation, and means for reversing the gas flow through such a series as a whole.

13. A carbureted water gas set comprising a single generator, a single carburetor, and a single superheater, connected in series in constant and uniform relation, and means for reversing the gas flow through such series as a whole, and means for drawing combustible gas from the set at bottom of the generator.

14. A carbureted water gas set comprising a single generator, a single carburetor, and a single superheater, connected in series in constant and uniform relation, and having a permanently unobstructed passage between the shells of the set, a jet device beyond the superheater and facing in a direction opposite the normal flow of gas for reversing the flow through the series as a whole, and means for withdrawing combustible gas from the bottom of the generator.

15. A carbureted water gas set comprising a single generator, a single carburetor, and a single superheater, and pipe connections between the individual shells of the set including a connection between the generator and carburetor, means for supplying steam to the set, and combustible gas offtakes from the set leading directly from the superheater and generator, the gas offtake from the generator being separate from and independent of the connection between the generator and carburetor, thereby allowing a free and unobstructed passage between said generator and carburetor.

16. A carbureted water gas set comprising a single generator, a single carburetor, and a single superheater, and pipe connections between the individual shells of the set including a connection between the generator and carburetor, means for supplying steam to the generator, means for supplying gas to the set beyond the generator outlet, and combustible gas offtakes from the set leading directly from the generator and superheater, the gas offtake from the generator being separate from and independent of the connection between the generator and carburetor, thereby allowing a free and unobstructed passage between said generator and carburetor.

17. A carbureted water gas set comprising as individual units, a single generator, a single carburetor, and a single superheater, connected in series in constant and uniform relation, the individual units being located in separate and detached shells, the generator shell having a bed of solid fuel, and the carburetor and superheater shells having solid heat interchange media therein, a pipe connection between the upper portion of the generator and the upper portion of the carburetor, a pipe connection between the base of the carburetor and the base of the superheater, said pipe connections permitting passage of gas within the set, means including a steam inlet at the base of the generator for passing steam up through the fuel bed in the generator, and means for passing steam down through the fuel bed in a subsequent gas making step, means for introducing oil directly to the solid medium in the carburetor shell, and combustible gas offtakes from the set leading directly from the superheater and the base of the generator respectively, the gas offtake from the generator being separate from and independent of the said connection between the upper portion of the generator and the upper portion of the carburetor, thereby allowing a free and unobstructed passage between the said generator and carburetor, while permitting reversal of direction of gas flow through the fuel bed of the generator.

18. A carbureted water gas set comprising a single generator having a fuel bed therein, a single carburetor, and a single superheater, each comprising a separate, individual and detached shell, said superheater arranged to complete the carbureting operation on the combustible gas passed therethrough, a gas connection between the upper portion of the generator and carburetor, a gas connection between the carburetor and superheater, means at the base of the generator for passing steam up through the fuel bed in the generator and means for passing steam down through the fuel bed in a subsequent gas making step, means for introducing the carbureting medium into the set, combustible gas offtakes from the set leading directly from the superheater and the base of the generator respectively, the said offtake from the generator being separate from and independent of the said connection between the upper portion of the generator and the carburetor, thereby allowing a free and unobstructed passage between said generator and carburetor.

19. A carburated water gas set comprising as individual units a single generator, a single carburetor and a single superheater, connected in series in constant and uniform relation, the individual units being located in separate and detached shells, the generator shell having a grate therein for supporting a bed of solid fuel and the carburetor and superheater shells having solid heat interchange media therein, a pipe connection between the upper portion of the generator and the upper portion of the carburetor, a pipe connection between the base of the carburetor and the base of the superheater, said pipe connections permitting the passage of gas within the set, means including a steam inlet at the base of the generator for passing steam up through the fuel bed in the generator and means for passing steam down through the fuel bed in a subsequent gas making step, means for introducing oil directly to the solid media in the carburetor shell and combustible gas offtakes from the set leading directly from the superheater and the base of the generator below the grate respectively, the gas offtake from the generator being separate from and independent of the said connection between the upper portion of the generator and the upper portion of the carburetor, thereby allowing a free and unobstructed passage between the said generator and carburetor.

20. An apparatus of the character described, comprising a single gas generator adapted to contain an incandescent solid fuel bed, a single primary heat interchanger, and a single secondary heat interchanger, connected together in a series in constant and uniform relation, the single units being located in separate and detached shells, a combustible gas offtake leading directly from the secondary heat interchanger, means for introducing steam into the apparatus, and means independent of the connections between the individual units of the series for withdrawing combustible gas directly from the apparatus at the generator after passing through the fuel bed.

21. An apparatus of the character described, comprising a single gas generator adapted to contain an incandescent solid fuel bed, a single primary heat interchanger and a single secondary heat interchanger, the single units being connected in series and located in separate and detached shells, combustible gas offtakes leading from the secondary heat interchanger and the generator directly to a place of storage or use, the gas offtake from the generator being separate from and independent of the connections between the individual units of the series, and means for controlling said gas offtakes.

22. An apparatus of the character described, comprising a single gas generator adapted to contain a bed of solid incandescent fuel, a single primary heat interchanger and a single secondary heat interchanger, connected in series in constant and uniform relation, the single units being located in separate and detached shells, a combustible gas offtake from the secondary heat interchanger, means for introducing into the series a fluid capable of reacting with the incandescent fuel in the generator, and means separate from and independent of the connections between the individual units of the series for withdrawing the resulting gaseous product directly from the bottom of the generator after passing through the fuel bed.

23. An apparatus of the character described, comprising a single gas generator adapted to contain a bed of solid incandescent fuel, a single primary heat interchanger and a single secondary heat interchanger, connected in series in constant and uniform relation, the single units being located in separate and detached shells, a combustible gas offtake from the secondary heat interchanger, means for introducing into the series a fluid capable of reacting with the incandescent fuel in the generator, and means separate from and independent of the connections between the individual units of the series for withdrawing the resulting gaseous product directly from the generator after passing through the fuel bed.

In testimony whereof I affix my signature.

DANIEL J. YOUNG.